United States Patent [19]
Donnelly

[11] 3,939,864
[45] Feb. 24, 1976

[54] VALVE LOCK
[75] Inventor: James F. Donnelly, Leicester, Mass.
[73] Assignee: Jamesbury Corporation, Worcester, Mass.
[22] Filed: May 29, 1974
[21] Appl. No.: 474,453

[52] U.S. Cl. ............................ 137/385; 251/113
[51] Int. Cl.² ..................................... F16K 35/04
[58] Field of Search ................. 137/385; 251/113

[56] References Cited
UNITED STATES PATENTS

| | | | |
|---|---|---|---|
| 454,640 | 6/1891 | Farmer | 251/113 |
| 887,826 | 5/1908 | Maniex | 137/385 |
| 1,131,382 | 3/1915 | Johnson | 137/385 |
| 1,377,668 | 5/1921 | Cates et al. | 137/385 |
| 1,599,894 | 9/1926 | Jach | 251/113 |
| 2,618,459 | 11/1952 | Forss | 251/113 |
| 3,542,331 | 11/1970 | Canalizo | 251/113 X |

Primary Examiner—Henry T. Klinksiek
Attorney, Agent, or Firm—Oblon, Fisher, Spivak, McClelland & Maier

[57] ABSTRACT

Disclosed is a lock for a valve having a stem which by rotation controls the opening and closing of the valve. The lock essentially comprises a housing having a first opening therein to receive the stem and a second opening; a locking member is disposed in the second opening and comprises a terminal portion which in its closed position contacts the stem and prevents the stem from rotating, a middle portion connected to the terminal portion and having a periphery substantially equal to the greatest periphery of the second opening, and an end portion connected to the middle portion and having a periphery less than the greatest periphery of the second opening. A spring is disposed within the second opening about the end portion and tends to force the terminal portion into its locking position in contact with the stem to prevent rotation of the stem whereby a force must be exerted axially along the locking member against the pressure exerted by the spring in order to move the terminal portion out of contact with the stem in order to permit rotation of the stem to open the valve.

5 Claims, 4 Drawing Figures

VALVE LOCK

The subject matter of this application is directed to a lock for a value. More particularly, the present invention relates to a lock for a valve which is opened by rotation of a stem connected thereto. The lock of the present invention functions to restrain the stem from rotation, thereby preventing opening of the valve.

For the purpose of illustrating the invention, there is shown in the drawings a form which is presently preferred, it being understood, however, that the invention is not limited to the precise instrumentalities and arrangements shown.

Figure 1:
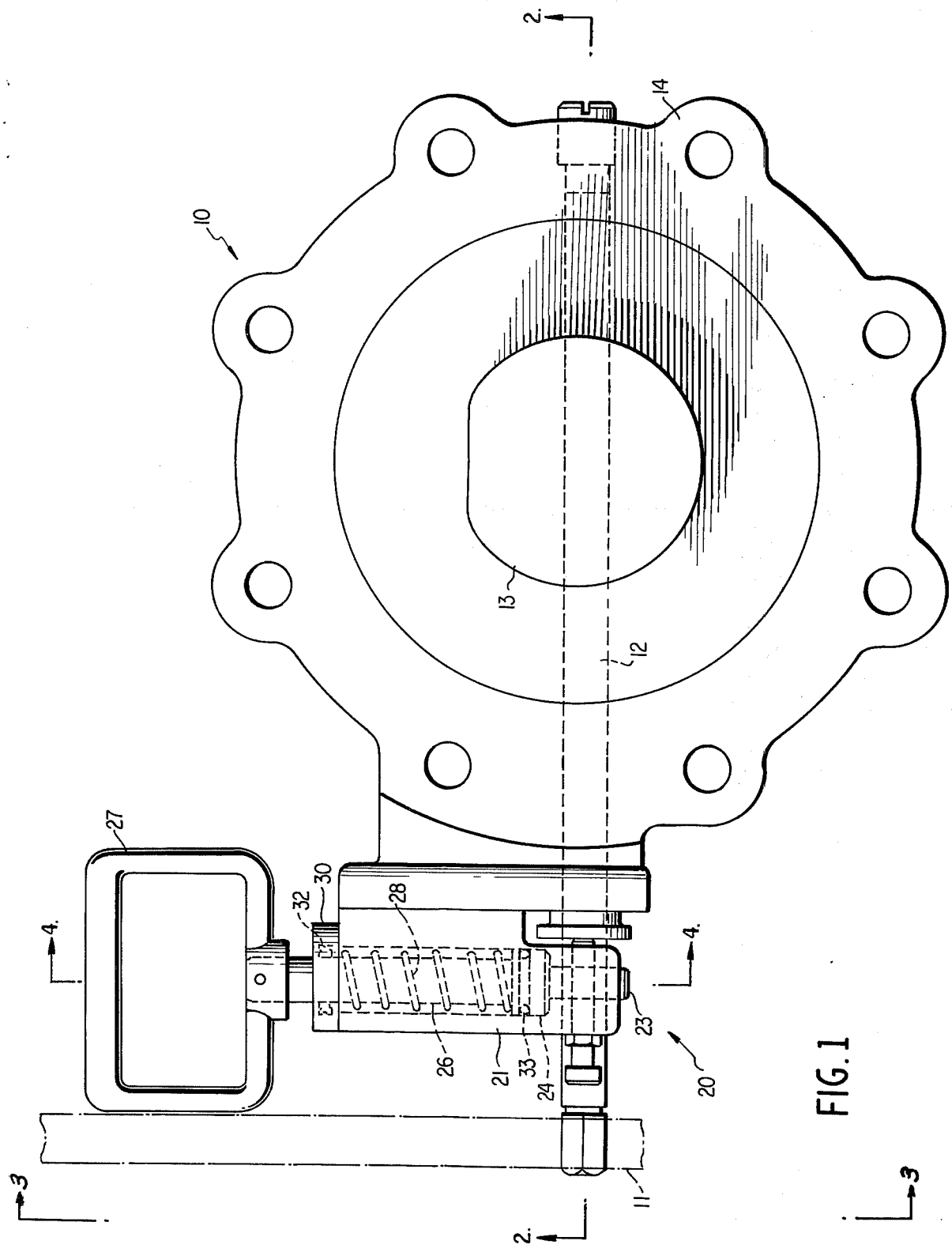
FIG. 1 is a view of the valve housing and the lock in accordance with the present invention.

Referring now to the drawings, FIG. 1 is a view of a valve assembly designated generally by the numeral 10. A valve handle 11 (shown in dotted lines) is mounted on the free end of a valve stem 12 mounted in a valve housing 14 such that rotation of the valve handle 11 will produce rotation of stem 12 which, in turn, produces rotation of a valve 13 which is rigidly associated with said shaft. While in the particular embodiment shown, the stem shaft 12 is connected to a butterfly valve, it is to be clearly understood that the present invention is equally applicable to other types of known valves such as ball valves. When valve 13 is rotated 90° from its closed position shown in FIG. 2, it reaches its maximum open position.

A lock housing assembly designated generally by the numeral 20 is rigidly mounted to valve assembly 10. A lock housing 21 is provided with a bore in which a locking member 22 in the form of a cylindrical plunger which is composed of terminal portion 23 of reduced diameter, first piston portion 24, second piston portion 25 and main body portion 26. A lock handle 27 is connected to the free end of main body portion 26. Helical spring 28 is disposed within the bore of lock housing 21 about the main body portion 26. As will be more fully explained hereinafter with reference to FIG. 4, placement of the terminal portion 23 in the position shown in FIG. 1 prevents rotation of stem 12 thereby preventing opening of valve 13. Terminal portion 23 is biased toward this locking position by the spring 28. Thus, in order to unlock stem shaft 12 to permit valve 13 to be opened it is necessary that axial pressure be exerted against handle 27 to compress spring 28 to withdraw terminal portion 23 from its locking position.

Figure 2:
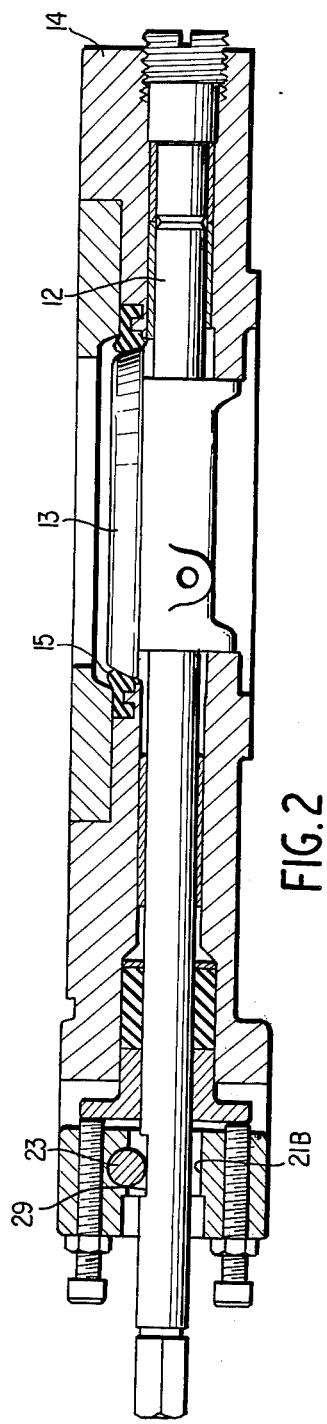
FIG. 2 is a cross sectional view taken along lines 2—2 of FIG. 1.

FIG. 2 is a view taken along lines 2—2 of FIG. 1 and shows valve 13 is in its closed position and cooperates with a sealing element 15. Stem shaft 12 is rigidly connected to valve body 13 so that rotation of shaft 12 produces rotation of the valve body 13. As shown in the leftmost portion of FIG. 2, stem 12 passes through a second bore 21B provided in lock housing 21 and has a flat portion or land 29 formed thereon for abutting against terminal portion 23 of locking member 22 when locking member 22 is in its shown locked position. It can therefore be seen from FIG. 2 how placement of terminal portion 23 in its locked position prevents rotation of shaft 12 thereby preventing the opening of valve 13.

Figure 3:
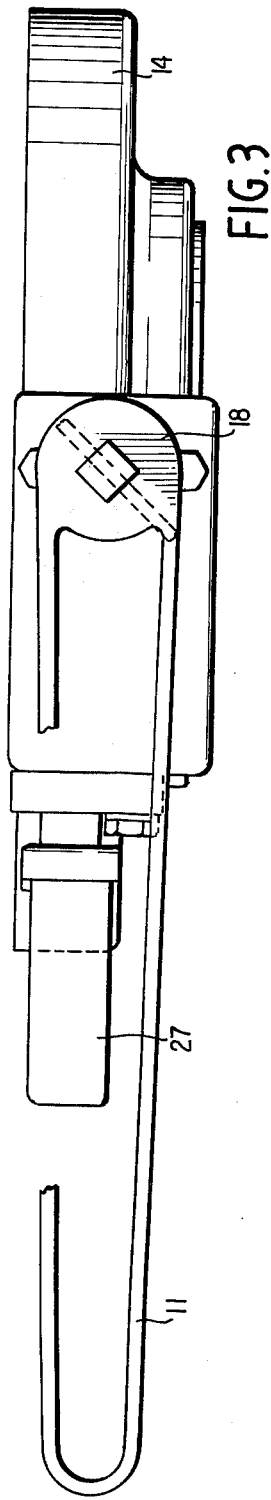
FIG. 3 is a view taken along lines 3—3 of FIG. 1.

FIG. 3 is a view in partial cut away fashion along lines 3—3 of FIG. 1 showing the positional relationship between valve handle 11 and lock handle 27. Valve handle 11 and lock handle 27 are closely spaced with respect to each other so that it is possible for a single operator to open the valve by exerting an axial force on lock handle 27 while, at the same time, rotating shaft 12 to open the valve once it has been unlocked.

Figure 4:
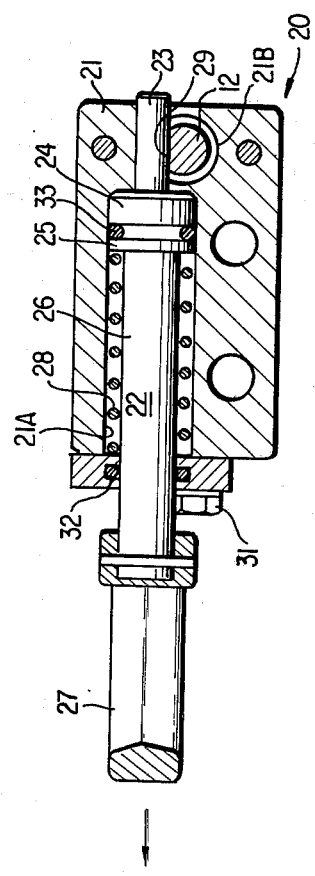
FIG. 4 is a cross sectional view taken along lines 4—4 of FIG. 2.

FIG. 4 is a cross-sectional view taken along lines 4—4 of FIG. 2. Disposed within the first bore of lock housing 21 is above-described locking member 22. Lock handle 27 is connected to the free end of main body portion 26 extending outside of the lock housing 21. Spring 28 is disposed about main body portion 26 within the first bore 21A in lock housing 21. Shaft 12 as well as flat portion 29 thereof is disposed within another bore 21B in lock housing 21 which is arranged perpendicular to the first bore and whose axes do not intersect.

A terminal assembly in the form of a cover plate 30 is secured to lock housing 21 by bolts 31. Disposed within plate 30 is a seal means 32 and a similar seal 33 is disposed between the opposed faces of pistons 25 and 24. Spring 28 acts against the plate 30 and piston 25 so as to urge the terminal portion 23 towards its locking position.

As best shown in FIG. 4, the positioning of terminal portion 23 in abutting relationship with flat portion 29 of stem 12 prevents the rotation of the stem about is axis, thereby preventing the opening of valve 13. Locking member 22 is biased to its closed position by the action of spring 28 against element 25. In order to permit the opening of valve 13, it is necessary to apply a force to handle 27 in the direction shown by the arrow in FIG. 4 in order to move terminal portion 23 of locking member 22 out of abutting relationship with flat portion 29 of stem 12. Once this has been accomplished, handle 11 may be rotated which will rotate stem 12 and thus open valve 13. When it is desired to move the valve body 13 into closed position with its cooperating sealing element 15, valve handle 11 may be moved to its closed position, thus permitting spring 28 to act upon piston 25 forcing terminal portion 23 of locking member 22 to its locking or abutting position.

In order to prevent contaminants from entering the portion of lock housing 21 wherein spring 28 is disposed, seal 33 disposed between the opposed faces of pistons 25 and 24 and seal 32 disposed within the terminal assembly or cover plate 30 are provided, thus preventing the entry of contaminants into the open area between them.

The present invention may be embodied in other specific form without departing from the spirit or essential attributes thereof. For example, the lock of the present invention can be used for a tank car valve in order to hold a valve body in the form of a disc in the closed position against hydro-dynamic forces from the commodity (e.g. liquid) being carried. In such application, the disc valve body will be held in a closed position even in the event of the tank car being derailed with high forces being applied to the valve stem handle. Accordingly, reference should be made to the appended claims rather than to the foregoing specification as indicating the scope of the invention.

I claim:

1. A lock for a valve having a stem, the opening and closing of the valve being controlled by rotation of the stem, said lock comprising:

a housing having a first opening therein to receive the stem, a second opening in said housing, a locking member disposed in said second opening, the longitudinal axis of said second opening being substantially perpendicular to and offset from the longitudinal axis of said first opening, said locking member including an elongated terminal portion which in the closed position of the locking member extends beyond said longitudinal axis of said first opening so that the elongated periphery of said terminal portion is disposed adjacent to a flat on the stem to prevent rotation thereof, said locking member also including biasing means to bias said terminal portion into its locking position whereby a force must be exerted axially along said locking member against the force of said biasing means in order to move said terminal portion away from its locking position and permit rotation of the stem.

2. The lock of claim 1 wherein said locking member includes a piston portion attached to said terminal portion, said piston portion having a periphery substantially equal to the greatest periphery of said second opening, a body portion having a periphery less than the periphery of said piston portion, and said biasing means is a coil spring disposed about said body portion and bearing against the end of said piston portion away from said terminal portion and against means at one end of said second opening.

3. The lock of claim 1 wherein the periphery of said terminal portion is substantially equal to the periphery of the portion of said second opening that surrounds said terminal portion when in its locking position to provide support for said terminal portion.

4. The lock of claim 1 wherein said housing has seal means in said first opening between said second opening and the fluid conduit of the valve whereby entry of external contaminants into the fluid conduit is prevented.

5. The lock of claim 4 wherein said seal means is resilient means disposed about the stem.

* * * * *

UNITED STATES PATENT AND TRADEMARK OFFICE
CERTIFICATE OF CORRECTION

PATENT NO. : 3,939,864
DATED : February 24, 1976
INVENTOR(S) : James F. Donnelly It is certified that error appears in the above-identified patent and that said Letters Patent are hereby corrected as shown below:

In the heading, item [73], correct the Corporate name of the assignee from "Jamesbury Corporation" to --Jamesbury Corp--;

In column 1, line 5, change "value." to --valve.--;

In column 1, line 56, delete "is";

In column 2, line 29, change "is" to --its--.

Signed and Sealed this

Twentieth Day of July 1976

[SEAL]

Attest:

RUTH C. MASON
*Attesting Officer*

C. MARSHALL DANN
*Commissioner of Patents and Trademarks*